United States Patent
Franjou et al.

(10) Patent No.: US 10,343,789 B2
(45) Date of Patent: Jul. 9, 2019

(54) SYSTEM FOR MONITORING STEERING OF A LANDING GEAR WHEEL OF AN AIRCRAFT

(71) Applicant: Airbus Operations SAS, Toulouse (FR)

(72) Inventors: Carl Franjou, Plaisance du Touch (FR); Adam Russell, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 16/137,688

(22) Filed: Sep. 21, 2018

(65) Prior Publication Data

US 2019/0092493 A1 Mar. 28, 2019

(30) Foreign Application Priority Data

Sep. 27, 2017 (FR) ...................................... 17 58944

(51) Int. Cl.
*B64D 45/00* (2006.01)
*B64C 25/34* (2006.01)
(Continued)

(52) U.S. Cl.
CPC .......... *B64D 45/0005* (2013.01); *B64C 25/34* (2013.01); *B64C 25/50* (2013.01);
(Continued)

(58) Field of Classification Search
CPC ..... B64D 45/0005; B64C 25/34; B64C 25/50; B64F 1/10; B64F 1/002; B64F 1/22
See application file for complete search history.

(56) References Cited

U.S. PATENT DOCUMENTS

| 4,658,924 A * | 4/1987 | Dobbie ..................... B64F 1/22 |
| | | 180/14.1 |
| 2005/0196256 A1 | 9/2005 | Rodenkirch et al. |

(Continued)

FOREIGN PATENT DOCUMENTS

| EP | 0206528 A1 | 12/1986 |
| EP | 0934879 A1 * | 8/1999 ................ B64F 1/22 |

(Continued)

OTHER PUBLICATIONS

French Search Report; priority document.

*Primary Examiner* — Mohamed Barakat
(74) *Attorney, Agent, or Firm* — Greer, Burns & Crain, Ltd.

(57) ABSTRACT

A system for monitoring steering of an aircraft landing gear wheel includes: a controller; a warning device for emitting warning signals for a tractor operator maneuvering the aircraft on the ground; and at least one angular sensor. The controller compares effective steering angle information, supplied by the angular sensor(s), with angles αSD, αMD, αSG and αMG, where αMD and αMG are limits of a predefined steering angle range within which the landing gear wheel steering is to remain confined, and where αSD and αSG are intermediate angles within the range. The controller commands emission of a warning signal when the comparison indicates that the steering of the landing gear wheel is between angles αSD and αMD or between angles αSG and αMG; and modulates the warning signal depending on the effective position of the steering between the angles αSD and αMD or between the angles αSG and αMG.

18 Claims, 5 Drawing Sheets

(51) Int. Cl.
  *B64C 25/50* (2006.01)
  *B64F 1/00* (2006.01)
  *B64F 1/22* (2006.01)
  *B64F 1/10* (2006.01)

(52) U.S. Cl.
  CPC ............... *B64F 1/002* (2013.01); *B64F 1/22* (2013.01); *B64F 1/10* (2013.01)

(56) References Cited

U.S. PATENT DOCUMENTS

| | | | |
|---|---|---|---|
| 2008/0183755 A1* | 7/2008 | Zak | H04M 1/72563 |
| 2009/0040072 A1* | 2/2009 | Read | B64C 25/50 340/960 |
| 2009/0261203 A1* | 10/2009 | Gouette | B64C 25/58 244/137.1 |
| 2012/0271495 A1 | 10/2012 | Pugh et al. | |
| 2016/0023525 A1* | 1/2016 | Lavoie | B60D 1/305 340/431 |
| 2017/0217572 A1* | 8/2017 | Vana | B60C 23/0408 |

FOREIGN PATENT DOCUMENTS

| | | |
|---|---|---|
| EP | 0934879 A1 | 8/1999 |
| EP | 1574430 A1 | 12/2008 |
| EP | 1999015 B1 | 11/2010 |

\* cited by examiner

SYSTEM FOR MONITORING STEERING OF A LANDING GEAR WHEEL OF AN AIRCRAFT

CROSS-REFERENCES TO RELATED APPLICATIONS

This application claims the benefit of the French patent application No. 1758944 filed on Sep. 27, 2017, the entire disclosures of which are incorporated herein by way of reference.

TECHNICAL FIELD OF THE INVENTION

The present invention relates to a landing gear wheel steering monitoring system intended to be fitted to an aircraft, and to an aircraft equipped with such a landing gear wheel steering monitoring system.

BACKGROUND OF THE INVENTION

To maneuver an aircraft on the ground, and more particularly to reverse it, a tractor is used. The tractor is driven by an operator and is attached to guiding landing gear of the aircraft. The guiding landing gear of the aircraft includes a first part, joined to the structure of the aircraft, and a second part to which the landing gear wheel is fixed and that has a degree of rotational freedom with respect to the first part, so as to allow the wheel to be steered. To provide the steering function, the first part primarily includes a drum, and the second part primarily includes a rotating tube. The landing gear wheel is able to move in rotation about an axis perpendicular to the axis of rotation of the second part with respect to the first part. The second part is typically telescopic with respect to the first part, so as to allow a shock-absorbing function to be performed.

The aircraft has to be steered within a predefined steering angle range. The operator of the tractor is not supposed to steer the aircraft outside of this predefined steering angle range; if he does, protective components of the landing gear are deformed and have to be replaced, which entails maintenance operations and therefore temporary grounding of the aircraft.

To allow the operator of the tractor to ensure that the steering of the aircraft is within the predefined steering angle range, visual markers are placed on the first part and on the second part of the landing gear. These visual markers are called steering angle indicators. The visual marker on the second part is situated in the axis of movement of the wheel on the ground. Two visual markers are situated on the first part so as to mark the limits of the predefined steering angle range. The operator has to continuously check, when maneuvering the aircraft using the tractor, that the visual marker situated on the second part of the landing gear does not leave the steering angle range marked by the two visual markers situated on the first part of the landing gear. It should be noted that these two visual markers may be situated at different locations on the structure of the aircraft, as long as they allow the operator to ensure that the steering of the aircraft is within the predefined steering angle range during the maneuvering performed using the tractor.

However, it is desirable to provide a solution that facilitates aircraft landing gear wheel steering monitoring for the operator of the tractor.

It is also desirable to provide a solution of this kind that is simple to implement and inexpensive, and, more particularly, that is easily incorporated into pre-existing systems in the aeronautical sector.

SUMMARY OF THE INVENTION

One aim of the present invention is to propose a system for monitoring steering of a landing gear wheel, the monitoring system being intended to be used in an aircraft equipped with the landing gear wheel, characterized in that the monitoring system includes: a controller; a warning device configured to emit, on the command of the controller, warning signals for the attention of a tractor operator intended to maneuver the aircraft on the ground; at least one angular sensor configured to supply the controller with effective steering angle measurement information for the landing gear wheel. The monitoring system is such that the controller implements: means for comparing the effective steering angle information with angles $\alpha SD$, $\alpha MD$, $\alpha SG$ and $\alpha MG$, where $\alpha MD$ and $\alpha MG$ are a maximum right-hand angle and a maximum left-hand angle, respectively, which correspond to the limits of a predefined steering angle range within which the steering of the landing gear wheel is supposed to remain confined, and where $\alpha SD$ and $\alpha SG$ are an intermediate right-hand angle and an intermediate left-hand angle, respectively, within the predefined steering angle range; means for commanding emission, by the warning device, of a warning signal when the comparison indicates that the steering of the landing gear wheel is situated between angles $\alpha SD$ and $\alpha MD$ or between angles $\alpha SG$ and $\alpha MG$; and means for modulating the warning signal depending on the effective position of the steering between the angles $\alpha SD$ and $\alpha MD$ or between the angles $\alpha SG$ and $\alpha MG$.

Thus, aircraft landing gear wheel steering monitoring is easier for the operator of the tractor. The monitoring system may be used regardless of the weather conditions or the ambient brightness, thereby making it possible, in particular, to facilitate the task of the driver of the tractor in the event of reduced visibility (rain, fog, glare, night, etc.). In addition, the monitoring system allows the driver to concentrate his attention on tasks (driving, monitoring the surroundings, etc.) other than monitoring the steering angle of the landing gear wheel.

According to one particular embodiment, the warning signal is modulated incrementally between the angles $\alpha SD$ and $\alpha MD$ and between the angles $\alpha SG$ and $\alpha MG$.

According to one particular embodiment, the controller implements means for applying a hysteresis principle in order to modulate the warning signal incrementally.

According to one particular embodiment, the warning device is a klaxon intended to be triggered by pressing on a dedicated button, called MECH CALL, of the cockpit of the aircraft, in parallel with any triggering by the controller in the context of monitoring steering of the landing gear wheel.

According to one particular embodiment, the warning device is a speaker intended to allow the operator of the tractor to be contacted by an intercom system from the cockpit of the aircraft and the monitoring system includes means for mixing the warning signal with possible voice signals coming from the intercom system.

According to one particular embodiment, the speaker is fitted to an audio headset intended to be worn by the operator of the tractor.

According to one particular embodiment, the warning device includes an assembly formed of a connector on the landing gear, of a cable connecting the driving cab of the tractor to the connector, the speaker being connected directly or indirectly to the cable.

According to one particular embodiment, the warning device includes an assembly formed of a wireless radio transmitter and an associated wireless radio receiver, situated in the driving cab of the tractor and connected to the speaker.

According to one particular embodiment, the speaker is situated on the landing gear or in the well of the landing gear.

According to one particular embodiment, the warning signal is an acoustic signal and/or a light signal.

Another aim of the present invention is to propose an aircraft equipped with a landing gear wheel and including a monitoring system such as outlined above.

BRIEF DESCRIPTION OF THE DRAWINGS

The features of the invention mentioned above, along with others, will become more clearly apparent on reading the following description of one exemplary embodiment, the description being given with reference to the appended drawings, in which.

DETAILED DESCRIPTION OF THE PREFERRED EMBODIMENTS

Figure 1:
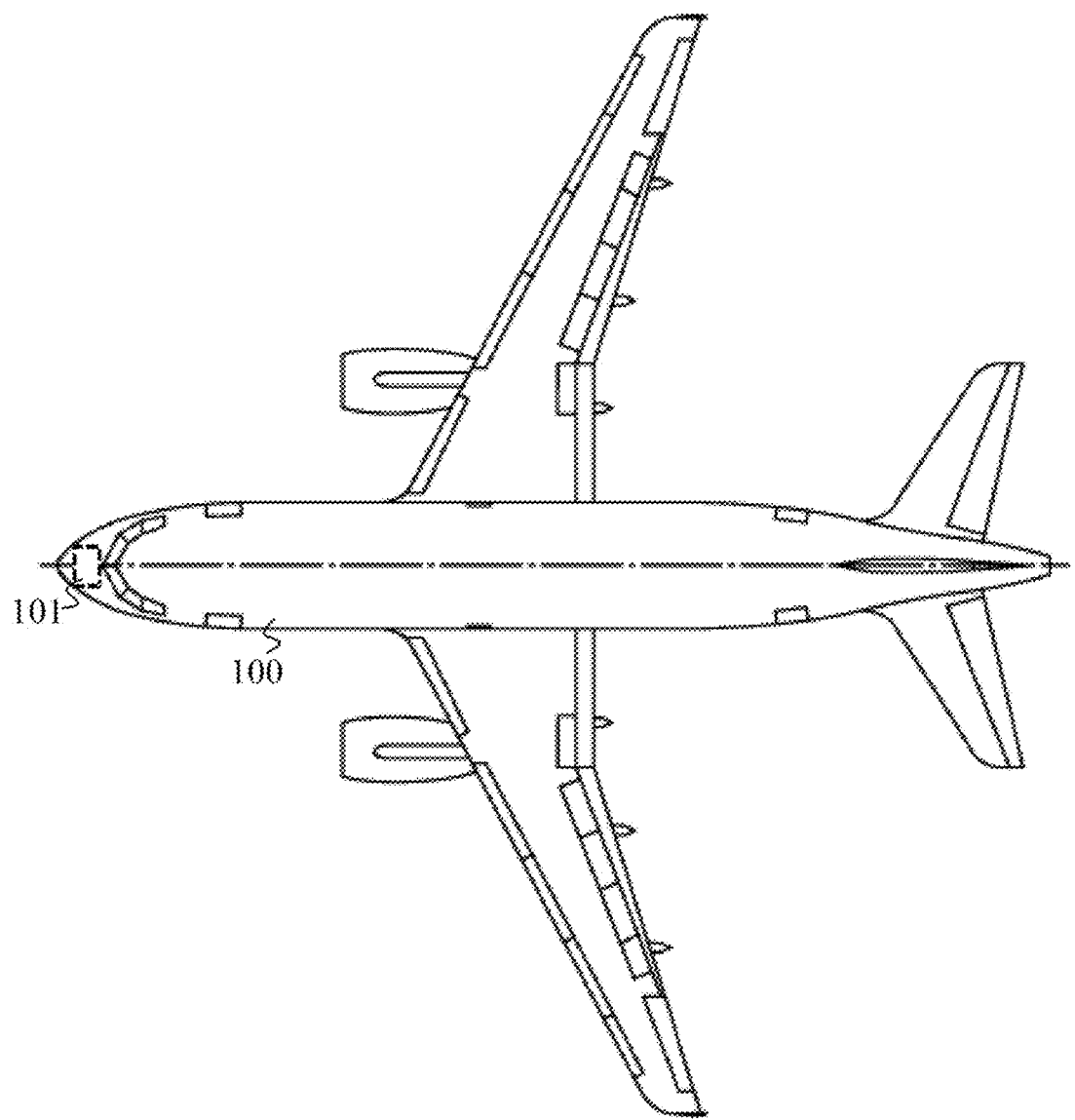
FIG. 1 shows a plan view of an aircraft in which a landing gear wheel steering monitoring system is installed.

FIG. 1 shows a plan view of an aircraft 100 that includes a fuselage, to either side of which a wing is fixed. The aircraft furthermore includes a landing gear wheel steering monitoring system 101. The wheel in question is preferably a nose wheel.

Figure 2:
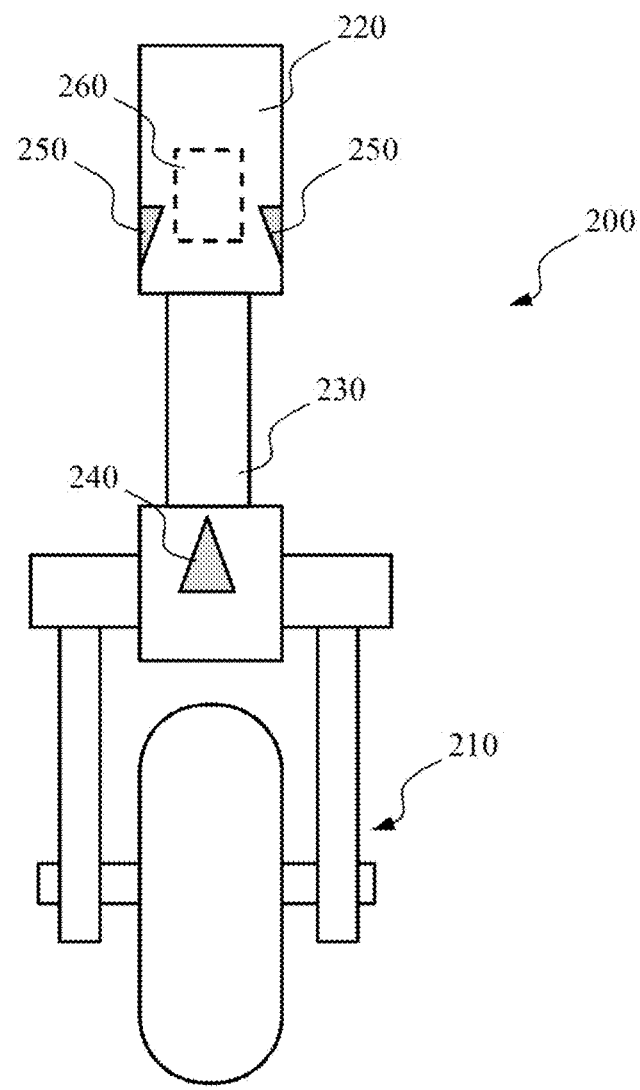
FIG. 2 schematically illustrates a portion of landing gear of the aircraft.

FIG. 2 schematically illustrates a portion 200 of a landing gear of the aircraft 100. The landing gear wheel 210 is assembled with a rotating tube 230 having a degree of rotational freedom with respect to a drum 220 that is joined to the structure of the aircraft 100. The layout of the rotating tube 230 and of the drum 220 allows the wheel 210 of the landing gear to be steered, and thus makes it possible to turn the aircraft 100 left or right during ground maneuvers. These maneuvers may be performed, in particular, using a tractor, which is then attached to the landing gear. The tractor is driven by an operator responsible for monitoring the performance of the maneuvers.

To allow the operator to ensure that the steering of the aircraft 100 is within the predefined steering angle range, the steering monitoring system 101 may be supplemented by steering angle indicators 240, 250, such as described above in the introduction. The steering angle indicators 250 define the limits of a predefined steering range within which the steering indicator 240 is supposed to remain confined during ground maneuvers.

In terms of the landing gear, the landing gear wheel steering monitoring system 101 includes an angular sensor 260 supplying an item of information representative of the effective steering angle of the aircraft 100. According to a first example, the angular sensor 260 is a rotational Hall-effect sensor. According to a second example, an optical coder is used to form the angular sensor 260. The angular sensor 260 is connected to a controller, responsible for processing the item of information representative of the effective steering angle of the aircraft 100, as described in detail hereinafter with reference to FIGS. 7 and 8.

The landing gear wheel steering monitoring system 101 may include several angular sensors 260, so as to offer landing gear wheel steering information redundancy.

Figure 3:
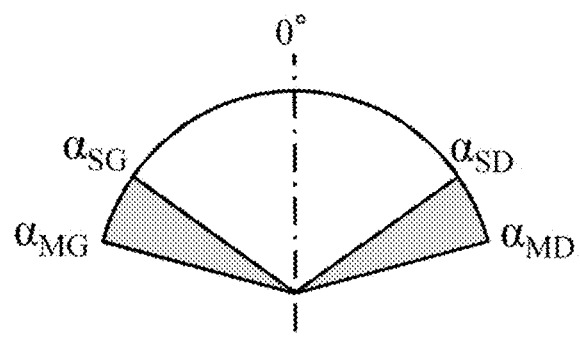
FIG. 3 schematically illustrates a steering angle range, within which intermediate angular thresholds are predefined.

FIG. 3 schematically illustrates the abovementioned predefined steering angle range. The steering angle range is limited by a maximum right-hand steering angle $\alpha MD$ and a maximum left-hand steering angle $\alpha MG$. The angles $\alpha MD$ and $\alpha MG$ are defined with respect to a neutral axis (0°) on which the wheel 210 is situated on the ground when the aircraft 100 is moving straight ahead. Typically, the angles $\alpha MD$ and $\alpha MG$ have the same absolute value (the ability of the aircraft 100 to steer to the right is the same as its ability to steer to the left).

An intermediate right-hand angular threshold $\alpha SD$ and an intermediate left-hand angular threshold $\alpha SG$ are predefined within the steering angle range limited by the angles $\alpha MD$ and $\alpha MG$. These angles $\alpha SD$ and $\alpha SG$ thus define a certain safety margin with respect to the angles $\alpha MD$ and $\alpha MG$. Typically, the angles $\alpha SD$ and $\alpha SG$ have the same absolute value (same margin to the right as to the left). When the landing gear wheel steering monitoring system 101 detects that the aircraft 100 is being steered between the angles $\alpha SD$ and $\alpha MD$ or between the angles $\alpha SG$ and $\alpha MG$, the landing gear wheel steering monitoring system 101 sends a warning signal for the attention of the operator maneuvering the tractor. This aspect is described in detail hereinafter with reference to FIGS. 4 and 5, on the one hand, and FIGS. 7 and 8, on the other hand.

Figure 4:
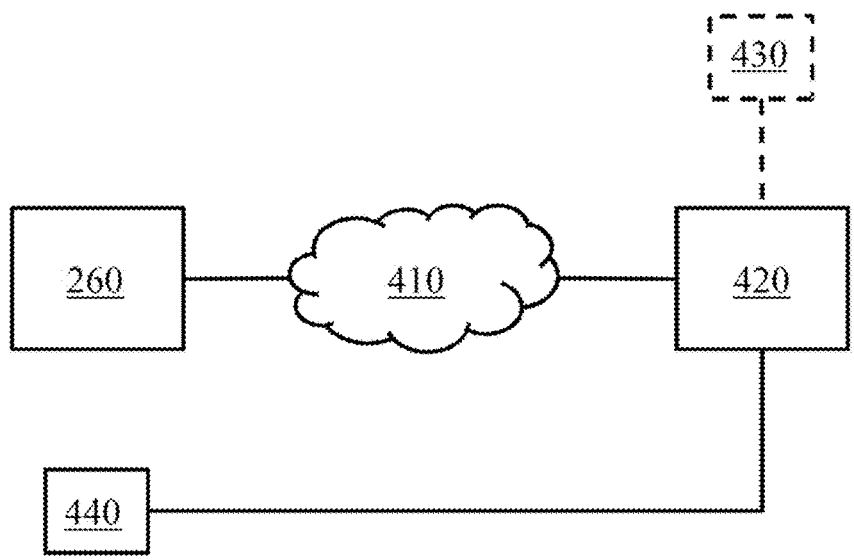
FIG. 4 schematically illustrates the landing gear wheel steering monitoring system according to a first embodiment.

FIG. 4 schematically illustrates the landing gear wheel steering monitoring system 101 according to a first embodiment.

In the context of this first embodiment, in addition to the angular sensor(s) 260 already mentioned, the landing gear wheel steering monitoring system 101 includes a controller 420 and a warning device 440 designed so as to emit an audio warning signal and/or a visual warning signal designed to warn the operator of the tractor that the aircraft 100 is being steered between the angles $\alpha SD$ and $\alpha MD$ or between the angles $\alpha SG$ and $\alpha MG$. The warning device 440 is commanded by the controller 420, which acts as a warning device driver as described hereinafter with reference to FIG. 7.

Each angular sensor 260 is connected to the controller 420 by virtue of a communication network 410 of the aircraft 100. In one particular embodiment, this communication network 410 corresponds to a deterministic switched Ethernet network, using, for example, a communication protocol compatible with the ARINC 664 part 7 standard. As a variant, other types of communication networks suitable for the field of embedded computers in aeronautics and other communication protocols may be implemented. A dedicated communication link may also be used instead of the communication network 410. Likewise, the controller 420 may be connected to the warning device 440 by way of the communication network 410, or, as illustrated in FIG. 4, by a communication link or dedicated control link.

The warning device 440 may be a speaker, for example situated on the landing gear in question, or in the well of the landing gear.

As a variant, the warning device 440 may be a klaxon, such as one triggered by pressing the button 'MECH CALL' (referenced 430 in FIG. 4) on the instrument panel of the cockpit of the aircraft 100. Preferably, the link connecting the controller 420 and the klaxon to one another is connected in parallel with the link connecting the button 'MECH CALL' 430 and the klaxon to one another. Another approach for placing the two use mechanisms of the klaxon in parallel, as shown in dashed lines in FIG. 4, is for the button 'MECH CALL' 430 to be connected to the controller 420, which is then responsible for triggering the klaxon when at least one of the two following situations occurs: pressing of the button 'MECH CALL' 430; and detection that the aircraft 100 is being steered between the angles $\alpha$SD and $\alpha$MD or between the angles $\alpha$SG and $\alpha$MG. Thus, the klaxon is triggered by pressing the button 'MECH CALL' in parallel with any triggering by the controller 420 in the context of monitoring steering of the wheel 210. It should thus be noted that the landing gear wheel steering monitoring system 101 is easily incorporated into a pre-existing system (MECH CALL) in the aeronautical sector.

As a variant, the warning device 440 may be an assembly formed of a wireless radio transmitter (e.g., of Bluetooth type) and an associated wireless radio receiver, situated in the driving cab of the tractor and connected to a speaker so as to broadcast the warning signal in audio form. The transmitter and the receiver are then associated using a dedicated pairing procedure.

As a variant, the warning device 440 may be an assembly formed of a connector on the landing gear, of a cable connecting the driving cab of the tractor to the connector, and of a speaker in the driving cab of the tractor, connected to the cable, so as to broadcast the warning signal in audio form.

As a variant, the warning device 440 may be a warning light, such as a lamp, or a rotating beacon, or a flashing light, or a signaling light, or a self-adhesive light-emitting film. The warning device 440 may also be an assembly of such warning lights.

As a variant, the warning device 440 may include an assembly formed of a wireless radio transmitter (e.g., of Bluetooth type) and an associated wireless radio receiver, situated in the driving cab of the tractor and connected to a warning light so as to broadcast the warning signal in visual form. The transmitter and the receiver are in this case also associated using a dedicated pairing procedure. The layout may be such that the warning signal may also adopt an audio form (see above).

As a variant, the warning device 440 may include an assembly formed of a connector on the landing gear, of a cable connecting the driving cab of the tractor to the connector, and of a warning light in the driving cab of the tractor, connected to the cable, so as to broadcast the warning signal in visual form. The layout may be such that the warning signal may also adopt an audio form (see above).

The warning signal emitted by the warning device 440 is modulated by the controller acting as a modulating device depending on the effective position of the steering between the angles $\alpha$SD and $\alpha$MD or between the angles $\alpha$SG and $\alpha$MG. In one particular embodiment, successive angular increments are defined between the angles $\alpha$SD and $\alpha$MD and between the angles $\alpha$SG and $\alpha$MG, and the controller 420 changes the form of the warning signal when such an increment is crossed. It should be noted that a hysteresis principle may be applied by the controller 420 in order to avoid untimely changes in the form of the warning signal.

In other words, the form of the warning signal changes depending on the effective position of the steering between the angles $\alpha$SD and $\alpha$MD or between the angles $\alpha$SG and $\alpha$MG. According to a first example, considering the warning signal to be in the form of regular beeps, the period between two successive beeps becomes shorter as the effective position of the steering gets closer to the maximum right-hand steering angle $\alpha$MD or to the maximum left-hand steering angle $\alpha$MG. The warning signal may become continuous when the effective position of the steering gets critically close to the maximum right-hand steering angle $\alpha$MD or to the maximum left-hand steering angle $\alpha$MG. According to a second example, considering the warning signal to be in the form of regular beeps, the sound frequency of the beeps becomes more high-pitched as the effective position of the steering gets closer to the maximum right-hand steering angle $\alpha$MD or to the maximum left-hand steering angle $\alpha$MG. According to a third example, considering the warning signal to be in the form of an acoustic reproduction of voice messages, for example of 'Warning . . . Warning' type, the period between two successive broadcasts of voice messages becomes shorter as the effective position of the steering gets closer to the maximum right-hand steering angle $\alpha$MD or to the maximum left-hand steering angle $\alpha$MG. According to a fourth example, considering the warning signal to be in light form, the color of the warning signal changes depending on the effective position of the steering. According to a fifth example, considering the warning signal to be in the form of flashing lights, the period between two successive flashes becomes shorter as the effective position of the steering gets closer to the maximum right-hand steering angle $\alpha$MD or to the maximum left-hand steering angle $\alpha$MG.

Figure 5:
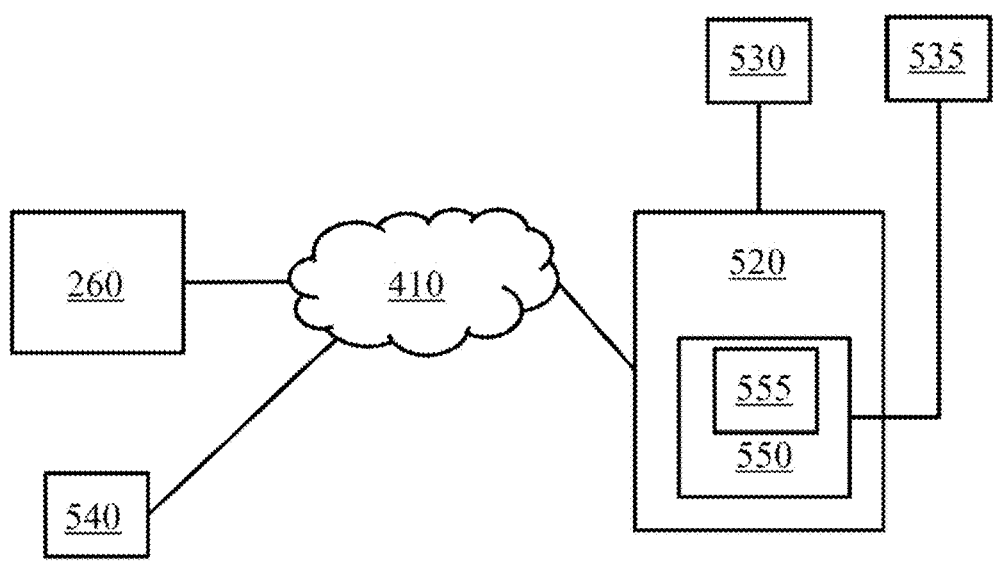
FIG. 5 schematically illustrates the landing gear wheel steering monitoring system according to a second embodiment.

FIG. 5 schematically illustrates the landing gear wheel steering monitoring system 101 according to a second embodiment.

In the context of this second embodiment, in addition to the angular sensor(s) 260 already mentioned, the landing gear wheel steering monitoring system 101 includes a controller 520 and a warning device 540 designed so as to emit an audio warning signal designed to warn the operator of the tractor that the aircraft 100 is being steered between the angles $\alpha$SD and $\alpha$MD or between the angles $\alpha$SG and $\alpha$MG. The warning device 540 is commanded by the controller 520, which acts as described hereinafter with reference to FIG. 8.

Each angular sensor 260 is connected to the controller 520, as already described with reference to FIG. 4 with regard to the controller 420. Plus, the warning device 540 is connected to the controller 520 by a dedicated communication link, or, as illustrated in FIG. 4, by the communication network 410.

The controller 520 is furthermore connected to an intercom system, which makes it possible to communicate from the cockpit to the operator of the tractor. The intercom system includes a button 530, situated in the cockpit, that makes it possible to activate and to deactivate a communication channel to an audio broadcast system able to be heard by the operator of the tractor, and which is in this case combined with the warning device 540 (speaker, audio headset). The intercom system also includes a microphone 535, situated in the cockpit, that makes it possible to capture the voice signals to be conveyed via the communication channel.

The controller 520 includes a mixer 550 responsible for mixing the audio warning signal, when the controller 520 has detected that the aircraft 100 is being steered between the angles αSD and αMD or between the angles αSG and αMG, with the possible voice signals coming from the intercom system. Otherwise, when the controller 520 has detected that the aircraft 100 is not being steered between the angles αSD and αMD or between the angles αSG and αMG, the mixer 550 retains only the voice signals coming from the intercom system. After mixing, the controller 520 transfers the resulting audio signals to the warning device 540 to be broadcast to the operator of the tractor. The audio warning signal is in this case generated by an audio synthesizer 555 configured by the controller 520 to produce, when necessary, the appropriate warning signal depending on the steering angle of the aircraft 100. The audio warning signal may adopt the forms already described with reference to FIG. 4 and that are compatible with broadcasting via a speaker.

The warning device 540 may be a speaker, for example situated on the landing gear in question, or in the well of the landing gear. The sound broadcast by this speaker then results from the mixing between the possible sound from the intercom and the audio warning signal.

As a variant, the warning device 540 may include an assembly formed of a connector on the landing gear, of a cable connecting the driving cab of the tractor to the connector, and the speaker (for example fitted to an audio headset intended to be worn by the operator of the tractor) is connected directly or indirectly (e.g., via a relay in the driving cab of the tractor) to the cable. The sound broadcast in the speaker then results from the mixing between the possible sound from the intercom and the audio warning signal.

As a variant, the warning device 440 may include an assembly formed of a wireless radio transmitter (e.g., of Bluetooth type) and an associated wireless radio receiver, situated in the driving cab of the tractor and connected to a speaker so as to broadcast the warning signal in audio form. The transmitter and the receiver are then associated using a dedicated pairing procedure. The sound broadcast by this speaker then results from the mixing between the possible sound from the intercom and the audio warning signal.

As a variant, the warning device 440 may include an assembly formed of a wireless radio transmitter (e.g., of Bluetooth type) and an associated wireless radio receiver of an audio headset intended to be worn by the operator of the tractor. The transmitter and the receiver are then associated using a dedicated pairing procedure. The sound broadcast by this audio headset then results from the mixing between the possible sound from the intercom and the audio warning signal.

As already explained with reference to FIG. 4, the audio warning signal emitted by the warning device 440 is modulated depending on the effective position of the steering between the angles αSD and αMD or between the angles αSG and αMG.

It should thus also be noted that the landing gear wheel steering monitoring system 101 is easily incorporated into a pre-existing system (intercom) in the aeronautical sector.

In one particular embodiment, in addition to the layouts presented above with reference to FIGS. 4 and 5, a display device is installed in the cab of the tractor so as to display, for example graphically, the current steering angle of the landing gear wheel in comparison with the maximum right-hand αMD and left-hand αMG steering angles. An item of information representative of the current steering angle of the landing gear wheel is then transmitted, for example by radio communication, from the controller 420 or the controller 520 to the display device.

Figure 6:
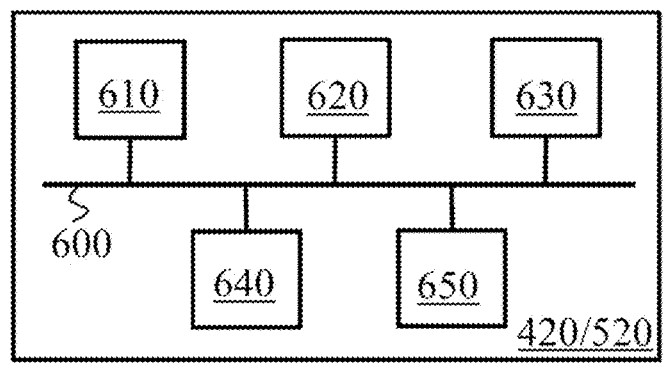
FIG. 6 schematically illustrates an exemplary hardware architecture of a controller of the landing gear wheel steering monitoring system.

FIG. 6 schematically illustrates an exemplary hardware architecture of the controller 420. The exemplary hardware architecture of FIG. 6 applies identically to the controller 520.

The controller 420 includes, linked by a communication bus 600: a processor or CPU (central processing unit) 610; a random access memory RAM 620, a read-only memory ROM 630; a storage unit 640, such as an HDD (hard disk drive), or a storage medium reader, such as an SD (secure digital) card reader; and a communication interface COM. The communication interface COM allows the controller 420 to exchange information and commands with other entities of the landing gear wheel steering monitoring system 101, and possibly other entities of the aircraft 100.

The processor CPU 610 is capable of executing instructions loaded into the memory RAM 620 from the memory ROM 630, from an external memory (not shown), from a storage medium (such as an SD card), or from a communication network (not shown). When the controller 420 is powered up, the processor CPU 610 is capable of reading instructions from the memory RAM 620 and of executing them. These instructions form a computer program that brings about the implementation, by the processor CPU 610, of all or some of the algorithms and steps described hereinafter with reference to FIG. 7 (with reference to FIG. 8 with regard to the controller 520).

All or some of the algorithms and steps described hereinafter may thus be implemented in software form through the execution of a set of instructions by a programmable machine, for example a DSP (digital signal processor) or a microcontroller, or be implemented in hardware form by a machine or a dedicated component, for example an FPGA (field-programmable gate array) or ASIC (application-specific integrated circuit) component. Generally, the controller 420 (and, in the same way, the controller 520) includes electronic circuitry designed to implement, in software and/or hardware form, the algorithms and steps described hereinafter with reference to FIG. 7 (with reference to FIG. 8 with regard to the controller 520).

Figure 7:
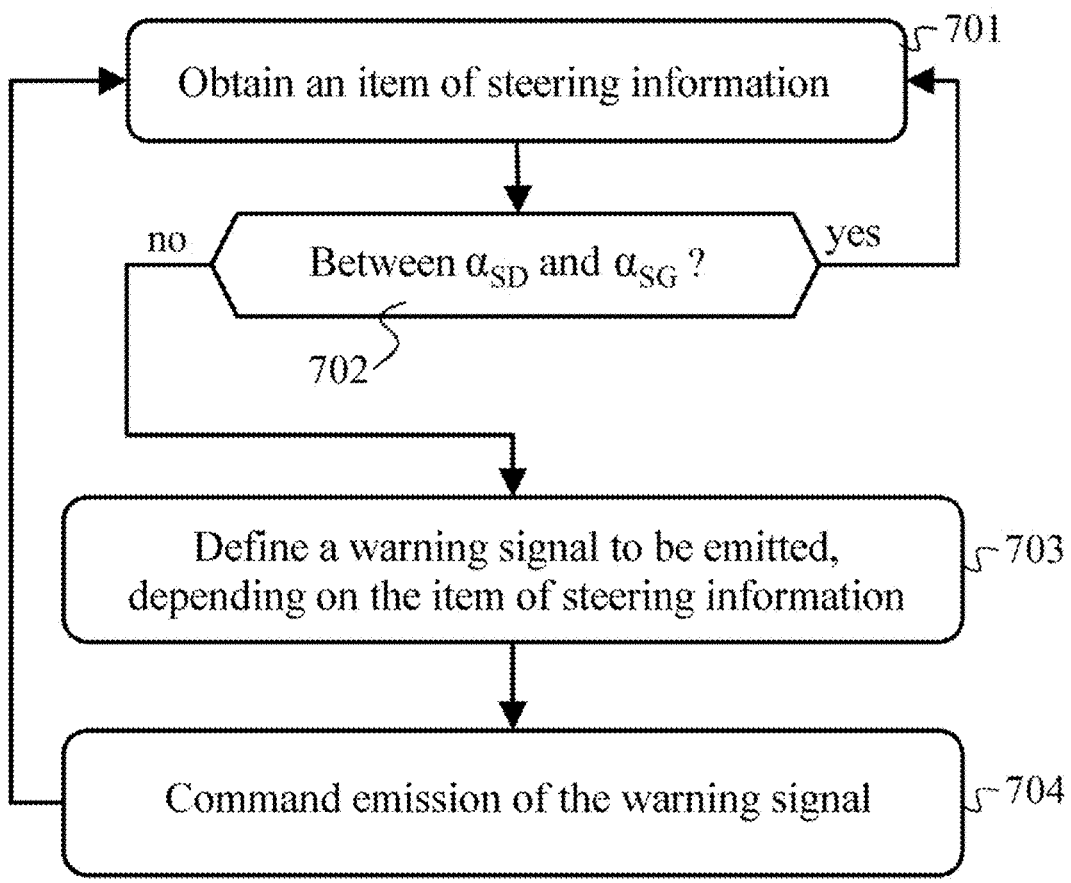
FIG. 7 schematically illustrates a flow chart of a landing gear wheel steering monitoring algorithm, according to the first embodiment of FIG. 4.

FIG. 7 schematically illustrates a flow chart of a landing gear wheel steering monitoring algorithm, according to the first embodiment of FIG. 4. More particularly, the algorithm of FIG. 7 is implemented by the controller 420.

In a step 701, the controller 420 obtains an item of effective steering information for the landing gear wheel from real-time measurements performed by the angular sensor 260. When the landing gear wheel steering monitoring system 101 includes several angular sensors 260 for the same landing gear, the controller 420 combines (e.g., averages) and/or filters (e.g., deletes one or more isolated measurements) the angular measurements fed back by the various angular sensors 260, so as to obtain a single item of steering information.

In a step 702, the controller 420 comprises a comparator which compares the item of steering information obtained in step 701 with the angles αSD, αMD, αSG and αMG. More particularly, the controller 420 checks whether the item of steering information obtained in step 701 indicates that the steering of the landing gear wheel is located between the intermediate angular thresholds αSD and αSG. If this is the case, step 701 is reiterated; if not, this means that the steering of the landing gear wheel is located between the angles αSD and αMD or between the angles αSG and αMG, and a step 703 is performed.

In step 703, the controller 420 defines a warning signal to be emitted depending on the item of steering information obtained in step 701. The controller 420 modulates the warning signal depending on the effective position of the steering between the angles αSD and αMD or between the angles αSG and αMG. Then, step 704 is performed.

In step 704, the controller 420 comprises a warning device driver and commands the emission of the warning signal defined in step 703. As already indicated, this warning signal may be in audio form and/or in light form.

In one particular embodiment that has already been outlined, the controller 420 commands the activation of the klaxon, which is able to be activated in parallel by the button 'MECH CALL' situated in the cockpit of the aircraft 100.

Step 701 is then reiterated.

The warning signal is thus emitted until the steering of the landing gear wheel is located between the intermediate angular thresholds αSD and αSG.

Figure 8:
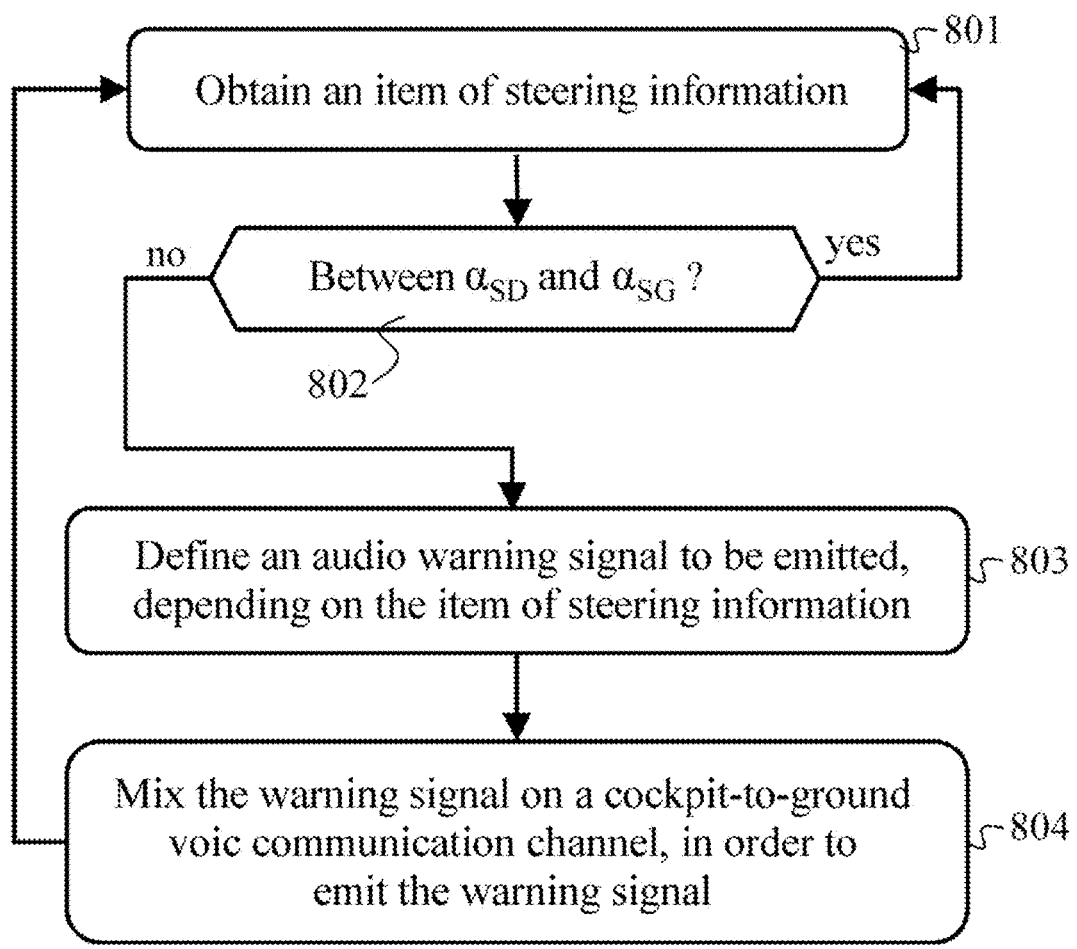
FIG. 8 schematically illustrates a flow chart of a landing gear wheel steering monitoring algorithm, according to the second embodiment of FIG. 5.

FIG. 8 schematically illustrates a flow chart of a landing gear wheel steering monitoring algorithm, according to the second embodiment of FIG. 5. More particularly, the algorithm of FIG. 8 is implemented by the controller 520.

In a step 801, the controller 520 obtains an item of effective steering information for the landing gear wheel from real-time measurements performed by the angular sensor 260. When the landing gear wheel steering monitoring system 101 includes several angular sensors 260 for one and the same landing gear, the controller 520 combines (e.g., averages) and/or filters (e.g., deletes one or more isolated measurements) the angular measurements fed back by the various angular sensors 260, so as to obtain a single item of steering information.

In a step 802, the controller 520 comprises a comparator and compares the item of steering information obtained in step 801 with the angles αSD, αMD, αSG and αMG. More particularly, the controller 520 checks whether the item of steering information obtained in step 801 indicates that the steering of the landing gear wheel is located between the intermediate angular thresholds αSD and αSG. If this is the case, step 801 is reiterated; if not, this means that the steering of the landing gear wheel is located between the angles αSD and αMD or between the angles αSG and αMG, and a step 803 is performed.

In step 803, the controller 520 defines an audio warning signal to be emitted depending on the item of steering information obtained in step 801. The controller 520 modulates the warning signal depending on the effective position of the steering between the angles αSD and αMD or between the angles αSG and αMG. Then, step 704 is performed. The warning signal thus defined by the controller 520 is able to be mixed with the possible voice signals coming from the intercom system that has already been outlined with reference to FIG. 5.

In step 804, the controller 520 mixes, or orders such mixing (when the mixer 550 is separate from the controller 520), the warning signal defined in step 803 with the possible voice signals coming from the intercom system. Thus, the controller 520 commands the emission of the warning signal.

Step 801 is then reiterated.

The warning signal is thus emitted, superimposed on the possible voice signals coming from the intercom system, until the steering of the landing gear wheel is located between the intermediate angular thresholds αSD and αSG.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for monitoring steering of a wheel of a landing gear, said monitoring system configured to be used in an aircraft equipped with said landing gear wheel, said monitoring system including:
   a controller;
   a warning device configured to emit, on a command of said controller, warning signals directed to an operator of a tractor maneuvering the aircraft on the ground; and
   at least one angular sensor configured to supply the controller with effective steering angle measurement information for said landing gear wheel,
   wherein the controller implements:
   means for undertaking a comparison of the effective steering angle information with angles αSD, αMD, αSG and αMG, where αMD and αMG are a maximum right-hand angle and a maximum left-hand angle, respectively, which correspond to limits of a predefined steering angle range within which a steering of the landing gear wheel is to remain confined, and where αSD and αSG are an intermediate right-hand angle and an intermediate left-hand angle, respectively, within said predefined steering angle range;
   means for commanding emission, by the warning device, of a warning signal when the comparison indicates that an effective position of the steering of the landing gear wheel is situated between angles αSD and αMD or between angles αSG and αMG; and
   means for modulating the warning signal depending on the effective position of the steering between the angles αSD and αMD or between the angles αSG and αMG, and
   wherein the warning device is a speaker configured to allow the operator of the tractor to be contacted by an intercom system from a cockpit of the aircraft, said monitoring system including means for mixing the warning signal with voice signals coming from the intercom system.

2. The monitoring system according to claim 1, wherein the means for modulating the warning signal is configured to modulate the warning signal incrementally between the angles αSD and αMD and between the angles αSG and αMG.

3. The monitoring system according to claim 2, wherein the controller implements means for applying a hysteresis principle to modulate the warning signal incrementally.

4. The monitoring system according to claim 1, wherein the speaker is fitted to an audio headset configured to be worn by the operator of the tractor.

5. The monitoring system according to claim 1, wherein the warning device includes an assembly formed of a connector on the landing gear, a cable connecting a driving cab of the tractor to said connector, the speaker being connected directly or indirectly to said cable.

6. The monitoring system according to claim 1, wherein the warning device includes an assembly formed of a wireless radio transmitter and an associated wireless radio receiver, situated in a driving cab of the tractor and connected to said speaker.

7. The monitoring system according to claim 1, wherein the speaker is situated on said landing gear or in a well of said landing gear.

8. An aircraft equipped with a landing gear wheel and including a monitoring system according to claim 1.

9. The monitoring system according to claim 1, wherein the at least one angular sensor is located on the landing gear and measures a steering angle of the landing gear wheel.

10. A system for monitoring steering of a wheel of a landing gear, said monitoring system configured to be used in an aircraft equipped with said landing gear wheel, said monitoring system including:
- a controller;
- a warning device configured to emit, on a command of said controller, warning signals directed to an operator of a tractor maneuvering the aircraft on the ground; and
- at least one angular sensor configured to supply the controller with effective steering angle measurement information for said landing gear wheel,
- wherein the controller implements:
- a comparator configured to undertake a comparison of the effective steering angle information with angles $\alpha SD$, $\alpha MD$, $\alpha SG$ and $\alpha MG$, where $\alpha MD$ and $\alpha MG$ are a maximum right-hand angle and a maximum left-hand angle, respectively, which correspond to limits of a predefined steering angle range within which a steering of the landing gear wheel is to remain confined, and where $\alpha SD$ and $\alpha SG$ are an intermediate right-hand angle and an intermediate left-hand angle, respectively, within said predefined steering angle range;
- a warning device driver configured to command emission, by the warning device, of a warning signal when the comparator issues a signal to the warning device driver that the steering of the landing gear wheel is situated between angles $\alpha SD$ and $\alpha MD$ or between angles $\alpha SG$ and $\alpha MG$; and
- a modulating device configured to modulate the warning signal depending on the effective position of the steering between the angles $\alpha SD$ and $\alpha MD$ or between the angles $\alpha SG$ and $\alpha MG$, and
- wherein the warning device is a speaker configured to allow the operator of the tractor to be contacted by an intercom system from a cockpit of the aircraft, said monitoring system including means for mixing the warning signal with voice signals coming from the intercom system.

11. The monitoring system according to claim 10, wherein the modulating device is configured to modulate the signal incrementally between the angles $\alpha SD$ and $\alpha MD$ and between the angles $\alpha SG$ and $\alpha MG$.

12. The monitoring system according to claim 11, wherein the controller is configured to apply a hysteresis principle to modulate the warning signal incrementally.

13. The monitoring system according to claim 10, wherein the speaker is fitted to an audio headset configured to be worn by the operator of the tractor.

14. The monitoring system according to claim 10, wherein the warning device includes an assembly formed of a connector on the landing gear, a cable connecting a driving cab of the tractor to said connector, the speaker being connected directly or indirectly to said cable.

15. The monitoring system according to claim 10, wherein the warning device includes an assembly formed of a wireless radio transmitter and an associated wireless radio receiver, situated in a driving cab of the tractor and connected to said speaker.

16. The monitoring system according to claim 10, wherein the speaker is situated on said landing gear or in a well of said landing gear.

17. An aircraft equipped with a landing gear wheel and including a monitoring system according to claim 10.

18. The monitoring system according to claim 10, wherein the at least one angular sensor is located on the landing gear and measures a steering angle of the landing gear wheel.

* * * * *